United States Patent
Meiyappan et al.

(10) Patent No.: US 12,149,881 B2
(45) Date of Patent: Nov. 19, 2024

(54) AUTOMATIC ACTIVE NOISE REDUCTION (ANR) CONTROL TO IMPROVE USER INTERACTION

(71) Applicant: Bose Corporation, Framingham, MA (US)

(72) Inventors: Somasundaram Meiyappan, Chennai (IN); Nathan A. Blagrove, Wayland, MA (US); Pepin Torres, Waltham, MA (US); Alaganandan Ganeshkumar, North Attleboro, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/218,095

(22) Filed: Jul. 4, 2023

(65) Prior Publication Data

US 2023/0353928 A1    Nov. 2, 2023

Related U.S. Application Data

(63) Continuation of application No. 17/411,005, filed on Aug. 24, 2021, now Pat. No. 11,696,063, which is a
(Continued)

(51) Int. Cl.
*H04R 1/10*    (2006.01)
*G06F 3/16*    (2006.01)
(Continued)

(52) U.S. Cl.
CPC ........... *H04R 1/1083* (2013.01); *G06F 3/167* (2013.01); *G10L 15/22* (2013.01); *H04R 1/08* (2013.01);
(Continued)

(58) Field of Classification Search
CPC ...... H04R 1/1083; H04R 1/08; H04R 1/1041; H04R 2201/107; H04R 2430/01;
(Continued)

(56) References Cited

U.S. PATENT DOCUMENTS

2006/0153394 A1\* 7/2006 Beasley ........... G10K 11/17827
                                                      381/102
2014/0126733 A1\* 5/2014 Gauger, Jr. ...... G10K 11/17837
                                                      381/71.6
(Continued)

FOREIGN PATENT DOCUMENTS

| CN | 102056036 B | 4/2017 |
| CN | 109151635 A | 1/2019 |
| CN | 109348338 A | 2/2019 |

OTHER PUBLICATIONS

Chinese Office Action dated Aug. 31, 2023 for Application No. 202080049274.3.
(Continued)

*Primary Examiner* — Yogeshkumar Patel
(74) *Attorney, Agent, or Firm* — Patterson + Sheridan, LLP

(57) ABSTRACT

A method performed by a wearable audio output device worn by a user is provided for controlling external noise attenuated by wearable audio output device. A speech is detected from a user wearing the wearable audio output device, wherein the audio output device has active noise reduction turned on. It is determined, based on the detecting, that the user desires to speak to a subject in the vicinity of the user. In response to the determining, a level of noise reduction is reduced to enable the user to hear sounds external to the audio output device. It is determined that the user desires to speak to the subject by detecting at least one condition of a plurality of conditions.

20 Claims, 3 Drawing Sheets

Related U.S. Application Data continuation of application No. 16/894,280, filed on Jun. 5, 2020, now Pat. No. 11,343,607, which is a continuation of application No. 16/439,311, filed on Jun. 12, 2019, now Pat. No. 10,681,453.

(51) Int. Cl.
    *G10L 15/08*     (2006.01)
    *G10L 15/22*     (2006.01)
    *H04R 1/08*     (2006.01)

(52) U.S. Cl.
    CPC .......... *G10K 2210/1081* (2013.01); *G10K 2210/1082* (2013.01); *G10K 2210/3023* (2013.01); *G10L 2015/088* (2013.01)

(58) Field of Classification Search
    CPC ..... H04R 2460/01; G06F 3/165; G06F 3/167; G10L 15/22; G10L 17/00; G10L 25/78; G10L 2015/088; G10K 11/17885; G10K 2210/1081; G10K 2210/1082; G10K 2210/3023; G10K 2210/108; G10K 2210/3014

See application file for complete search history.

(56) References Cited

U.S. PATENT DOCUMENTS

| | | | |
|---|---|---|---|
| 2015/0110263 A1* | 4/2015 | Johnston | H04R 1/1041 381/74 |
| 2017/0193978 A1* | 7/2017 | Goldman | G10K 11/17881 |
| 2017/0318374 A1* | 11/2017 | Dolenc | H04R 29/004 |
| 2018/0286424 A1* | 10/2018 | Fadell | G10L 21/0224 |

OTHER PUBLICATIONS

Chinese Office Action dated Mar. 5, 2024 for Application No. 202080049274.3.

European Office Action dated Aug. 17, 2023 for Application No. 20750482.0.

\* cited by examiner

AUTOMATIC ACTIVE NOISE REDUCTION (ANR) CONTROL TO IMPROVE USER INTERACTION

RELATED APPLICATIONS

This application is a continuation of U.S. patent application Ser. No. 17/411,005, filed Aug. 24, 2021, which is a continuation of U.S. patent application Ser. No. 16/894,280, filed Jun. 5, 2020, now U.S. Pat. No. 11,343,607, which issued on May 24, 2022, which is a continuation of U.S. patent application Ser. No. 16/439,311, filed Jun. 12, 2019, now U.S. Pat. No. 10,681,453, which issued on Jun. 9, 2020. The foregoing filings are incorporated herein by reference in their entirety.

FIELD

Aspects of the disclosure generally relate to controlling external noise in an audio output device, and more specifically to automatic Active Noise Reduction (ANR) control to improve user interaction with another subject.

BACKGROUND

Wearable audio output devices having noise cancelling capabilities have steadily increased in popularity. Modern headphones with ANR (sometimes referred to as active noise cancelling (ANC)) capabilities attenuate sounds external to the headphones to provide an immersive audio experience to the user. However, a user may want to selectively set a level of attenuation of external sounds to suit particular use cases. For instance, there may be certain situations when a user wearing the headphones with ANR turned on may want or need to set the ANR to a low level to increase situational awareness. On the other hand, there may be situations when the user may want the ANR set to a high level to attenuate external sounds. While most ANR audio devices allow the user to manually turn ANR on or turn off, or even manually set a level of the ANR, this does not provide an optimal user experience. Accordingly, methods for automatic selective ANR control as well as apparatuses and systems configured to implement these methods are desired.

SUMMARY

All examples and features mentioned herein can be combined in any technically possible manner.

Aspects of the present disclosure provide a method for controlling external noise in a wearable audio output device. The method generally includes detecting a speech signal from a user wearing the wearable audio output device, wherein the audio output device has active noise reduction turned on; determining, based at least on the detecting, that the user desires to speak to a subject in the vicinity of the user; and in response to the determining, modifying a level of the active noise reduction to enable the user to hear sounds external to the audio output device.

In an aspect, determining that the user desires to speak to the subject includes detecting at least one of the detected speech signal does not include a wake-up word (WUW) configured to trigger a voice personal assistant (VPA); the detected speech signal does not include voice commands for the VPA; the user is participating in a phone conversation using the audio output device and a voice stream of the user related to the phone conversation as received from the microphone of the audio output device is set to mute by the user; or the user is streaming music to the audio output device and the speech signal does not indicate that the user is singing.

In an aspect, detecting the detected speech signal does not include voice commands for the VPA includes determining at least one word uttered by the user within a given time period after detecting the WUW is a voice command for the VPA.

In an aspect, detecting a speech signal from a user wearing the wearable audio output device includes at least one of detecting that a sound signal including the speech signal is emanating from a general direction of the user's mouth; detecting that the sound signal includes the speech signal using voice activity detection (VAD); detecting that the user's mouth is moving; or detecting an identity of the user based on the speech signal.

In an aspect, modifying a level of the active noise reduction includes temporarily reducing the level of the active noise reduction for a configured time period.

In an aspect, the method further includes detecting, during the time period, an additional speech signal from the user; determining, based at least on detecting the additional speech signal, that the user desires to continue speaking to the subject; and resetting the time period in response to determining that the user desires to continue speaking to the subject.

In an aspect, determining that the user desires to continue speaking to the subject includes detecting that the detected additional speech signal does not include a wake-up word (WUW) configured to trigger a voice personal assistant (VPA).

In an aspect, the method further includes resetting, after expiration of the time period, the level of the active noise reduction to at least one of a configured value or a value at which the level was set before the modification.

In an aspect, the method further includes lowering a volume of audio output by at least one speaker of the audio output device.

In an aspect, the method further includes when the user is participating in a phone conversation using the audio output device and when the active noise reduction is at the modified level, detecting that a voice stream of the user related to the phone conversation as received from the microphone of the audio output device is set to unmute by the user; and in response, resetting the level of the active noise reduction to at least one of a configured value or a value at which the level was set before the reduction.

Aspects of the present disclosure provide an audio output device for controlling external noise in the audio output device. The audio output device generally includes at least one microphone for detecting sounds in the vicinity of the audio output device; active noise reduction circuitry for attenuating external noise; an interface for communicating with a user device; and at least one processor. The at least one processor is generally configured to detect, using the at least one microphone, a speech signal from a user wearing the wearable audio output device, wherein the audio output device has the active noise reduction turned on; determine, based at least on the detecting, that the user desires to speak to a subject in the vicinity of the user; and in response to the determining, modify a level of the active noise reduction using the active noise reduction circuitry, to enable the user to hear sounds external to the audio output device.

In an aspect, the at least one processor is configured to determine that the user desires to speak to a subject by detecting at least one of the detected speech signal does not include a wake-up word (WUW) configured to trigger a voice personal assistant (VPA); the detected speech signal does not include voice commands for the VPA; the user is participating in a phone conversation using the audio output device and a voice stream of the user related to the phone conversation as received from the microphone of the audio output device is set to mute by the user; or the user is streaming music to the audio output device and that the speech signal does not indicate that the user is singing.

In an aspect, the at least one processor is configured to detect the detected speech signal does not include voice commands for the VPA by determining at least one word uttered by the user within a given time period after detecting the WUW is a voice command for the VPA.

In an aspect, the at least one processor is configured to detect a speech signal from a user wearing the wearable audio output device by at least one of detecting that a sound signal including the speech signal is emanating from a general direction of the user's mouth; detecting that the sound signal includes the speech signal using voice activity detection (VAD); detecting that the user's mouth is moving; or detecting an identity of the user based on the speech signal.

In an aspect, modifying a level of the active noise reduction includes temporarily reducing the level of the active noise reduction for a configured time period.

In an aspect, the at least one processor is further configured to detect, during the time period, an additional speech signal from the user; determine, based at least on detecting the additional speech signal, that the user desires to continue speaking to the subject; and reset the time period in response to determining that the user desires to continue speaking to the subject.

Aspects of the present disclosure provide an apparatus for controlling external noise in an audio output device. The apparatus generally includes at least one processor and a memory coupled to the at least one processor. The processor is generally configured to detect a speech signal from a user wearing the wearable audio output device, wherein the audio output device has active noise reduction turned on; determine, based at least on the detecting, that the user desires to speak to a subject in the vicinity of the user; and in response to the determining, modify a level of the active noise reduction to enable the user to hear sounds external to the audio output device.

In an aspect, the at least one processor is configured to determine that the user desires to speak to a subject by detecting at least one of the detected speech signal does not include a wake-up word (WUW) configured to trigger a voice personal assistant (VPA); the detected speech signal does not include voice commands for the VPA; the user is participating in a phone conversation using the audio output device and a voice stream of the user related to the phone conversation as received from the microphone of the audio output device is set to mute by the user; or the user is streaming music to the audio output device and that the speech signal does not indicate that the user is singing.

In an aspect, the at least one processor is configured to detect the detected speech signal does not include voice commands for the VPA by determining at least one word uttered by the user within a given time period after detecting the WUW is a voice command for the VPA.

In an aspect, the at least one processor is configured to detect a speech signal from a user wearing the wearable audio output device by at least one of detecting that a sound signal including the speech signal is emanating from a general direction of the user's mouth; detecting that the sound signal includes the speech signal using voice activity detection (VAD); detecting that the user's mouth is moving; or detecting an identity of the user based on the speech signal.

In an aspect, modifying a level of the active noise reduction includes temporarily reducing the level of the active noise reduction for a configured time period.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

DETAILED DESCRIPTION

Wearable audio output devices with ANR capability (e.g., ANR headphones) help users enjoy high quality music and participate in productive voice calls by attenuating sounds including noise external to the audio output devices. However, ANR headphones acoustically isolate the user from the world making it difficult for the user to interact with other people in the vicinity of the user. Thus, when the user wearing the headphones with ANR turned on desires to speak with another person, the user either has to manually lower the level of ANR (e.g., by using a button on the headphones) or has to remove the headphones fully or partially from its regular listening position. This does not provide an optimal experience to the user. Additionally, removing the headphones from its listening position does not allow the user to listen to audio (e.g., music playback or a conference call) while simultaneously speaking to another person.

Aspects of the present disclosure discuss techniques for automatically controlling an ANR level of a wearable audio output device (e.g., temporarily interrupt or lower the ANR level) to enable the user to speak with one or more other subjects (e.g., other people) in the vicinity of the user. Additionally, the discussed techniques allow the user to effectively interact with other people without having to remove the wearable audio output device from its regular listening position, such that the user can simultaneously listen to audio being played on the device speakers while interacting with others.

Conventional ANR headphones generally require a user interface (UI) to change a level of the ANR. This UI may take many forms including a button press or a gesture control. Aspects of the present disclosure provide techniques for automatically lowering the ANR based on detecting a user's intent to speak with another subject (e.g., another person, automated voice system, etc.). Detecting the user's intent to speak may take into account a combination of detecting that the user is speaking (which may be captured by a beam-former on the headphone microphones and voice activity detection (VAD) that adapts to the overall noise floor of the environment) and checking for one or more other conditions to confirm that the user's detected speech is not related to a purpose other than to speak with another subject (e.g., speech related to a hands free profile (HFP) call, a voice command for a virtual personal assistant (VPA), the user singing, etc.).

In certain aspects, the discussed techniques provide a UI free solution to allow the user to multi-task, for example by interacting with a second party in the real-world while listening to a voice call or music on the headphone speakers.

Figure 1:
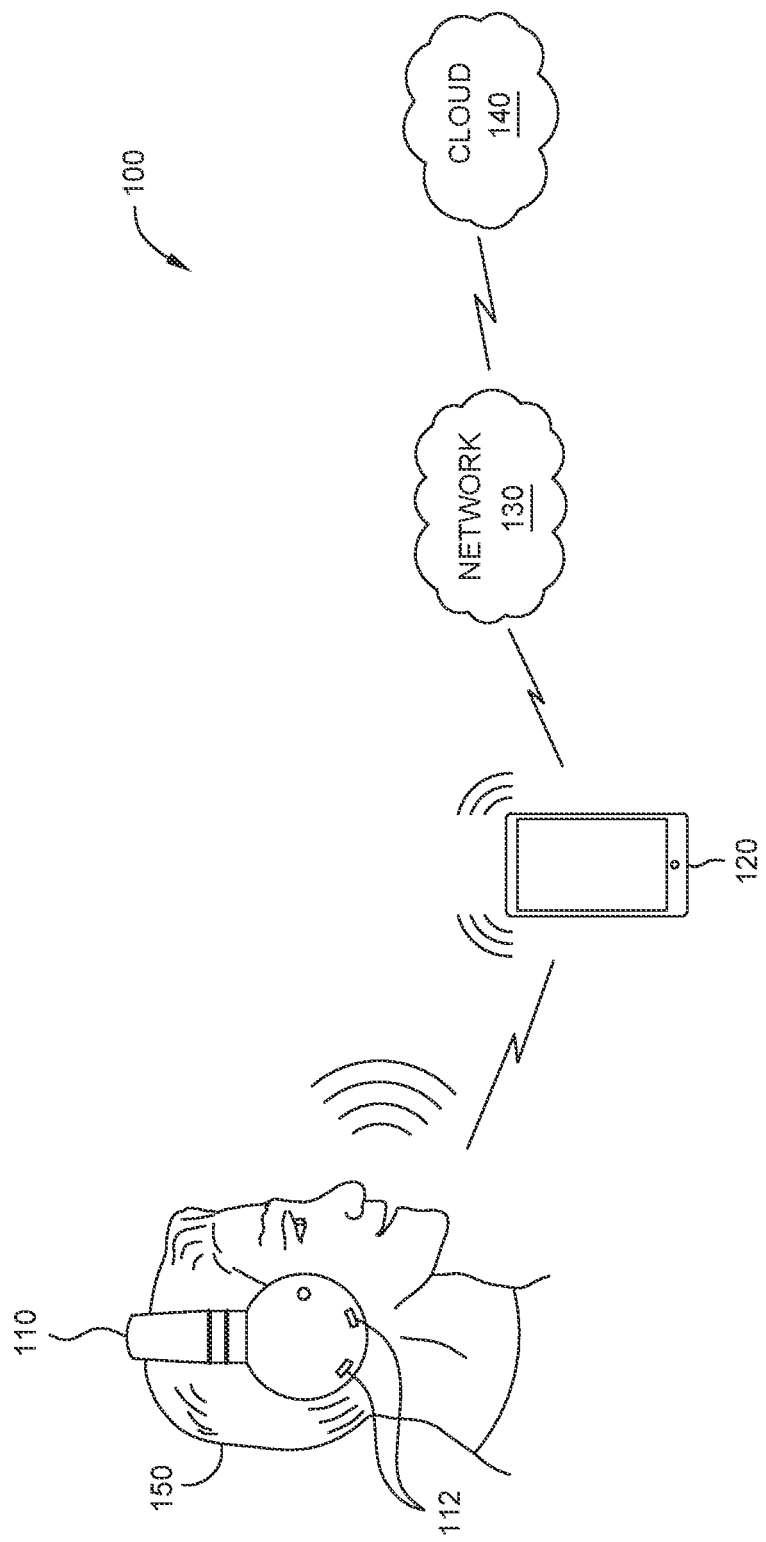
FIG. 1 illustrates an example system in which aspects of the present disclosure may be practiced.

FIG. 1 illustrates an example system 100 in which aspects of the present disclosure may be practiced.

As shown, system 100 includes a pair of headphones 110 worn by a user 150. The headphones 110 are communicatively coupled to a portable user device 120. In an aspect, the headphones 110 may include one or more microphones 112 to detect sound in the vicinity of the headphones 110. The headphones 110 also include at least one acoustic transducer (also known as driver or speaker) for outputting sound. The included acoustic transducer(s) may be configured to transmit audio through air and/or through bone (e.g., via bone conduction, such as through the bones of the skull). The headphones 110 may further include hardware and circuitry including processor(s)/processing system and memory configured to implement one or more sound management capabilities or other capabilities including, but not limited to, noise cancelling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the headphones 110 by using active noise cancelling (also known as active noise reduction). The sound masking circuitry is configured to reduce distractions by playing masking sounds via the speakers of the headphones 110. The movement detecting circuitry is configured to use devices/sensors such as an accelerometer, gyroscope, magnetometer, or the like to detect whether the user wearing the headphones is moving (e.g., walking, running, in a moving mode of transport, etc.) or is at rest and/or the direction the user is looking or facing. The movement detecting circuitry may also be configured to detect a head position of the user for use in augmented reality (AR) applications where an AR sound is played back based on a direction of gaze of the user. The geolocation circuitry may be configured to detect a physical location of the user wearing the headphones. For example, the geolocation circuitry includes Global Positioning System (GPS) antenna and related circuitry to determine GPS coordinates of the user.

In an aspect, the headphones 110 include voice activity detection (VAD) circuitry capable of detecting the presence of speech signals (e.g. human speech signals) in a sound signal received by the microphones 112 of the headphones 110. For instance, as shown in FIG. 1, the microphones 112 of the headphones 110 may receive ambient external sounds in the vicinity of the headphones 110, including speech uttered by the user 150. Thus, the sound signal received by the microphones 112 has the user's speech signal mixed in with other sounds in the vicinity of the headphones 110. Using the VAD, the headphones 110 may detect and extract the speech signal from the received sound signal.

In an aspect, the headphones 110 include speaker identification circuitry capable of detecting an identity of a speaker to which a detected speech signal relates to. For example, the speaker identification circuitry may analyze one or more characteristics of a speech signal detected by the VAD circuitry and determine that the user 150 is the speaker. In an aspect, the speaker identification circuitry may use any of the existing speaker recognition methods and related systems to perform the speaker recognition.

In an aspect, the headphones 110 are wirelessly connected to the portable user device 120 using one or more wireless communication methods including but not limited to Bluetooth, Wi-Fi, Bluetooth Low Energy (BLE), other radio frequency (RF)-based techniques, or the like. In an aspect, the headphones 110 includes a transceiver that transmits and receives information via one or more antennae to exchange information with the user device 120.

In an aspect, the headphones 110 may be connected to the portable user device 120 using a wired connection, with or without a corresponding wireless connection. As shown, the user device 120 may be connected to a network 130 (e.g., the Internet) and may access one or more services over the network. As shown, these services may include one or more cloud services 140.

The portable user device 120 is representative of a variety of computing devices, such as mobile telephone (e.g., smart phone) or a computing tablet. In an aspect, the user device 120 may access a cloud server in the cloud 140 over the network 130 using a mobile web browser or a local software application or "app" executed on the user device 120. In an aspect, the software application or "app" is a local application that is installed and runs locally on the user device 120. In an aspect, a cloud server accessible on the cloud 140 includes one or more cloud applications that are run on the cloud server. The cloud application may be accessed and run by the user device 120. For example, the cloud application may generate web pages that are rendered by the mobile web browser on the user device 120. In an aspect, a mobile software application installed on the user device 120 and a cloud application installed on a cloud server, individually or in combination, may be used to implement the techniques for keyword recognition in accordance with aspects of the present disclosure.

It may be noted that although certain aspects of the present disclosure discuss automatic ANR control in the context of headphones 110 for exemplary purposes, any wearable audio output device with similar capabilities may be interchangeably used in these aspects. For instance, a wearable audio output device usable with techniques discussed herein may include over-the-ear headphones, audio eyeglasses or frames, in-ear buds, around-ear audio devices, open-ear audio devices (such as shoulder-worn or other body-worn audio devices) or the like.

Figure 2:
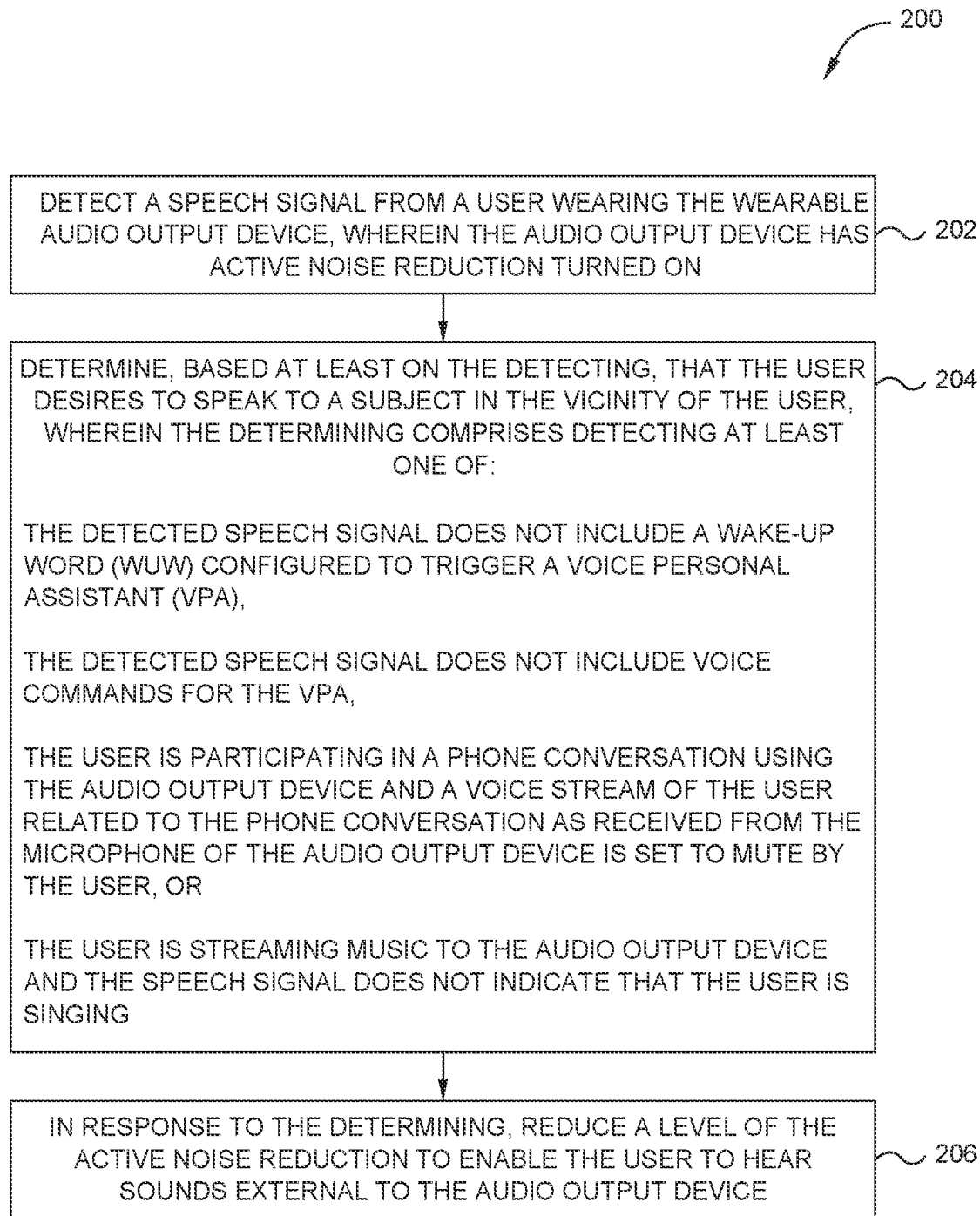
FIG. 2 illustrates example operations performed by a wearable audio output device worn by a user for controlling external noise, in accordance with certain aspects of the present disclosure.

FIG. 2 illustrates example operations 200 performed by a wearable audio output device (e.g., headphones 110 as shown in FIG. 1) worn by a user (e.g., user 150) for controlling external noise attenuated by the wearable audio output device, in accordance with certain aspects of the present disclosure.

Operations 200 begin, at 202, by detecting a speech signal from a user wearing the wearable audio output device, wherein the audio output device has active noise reduction turned on.

At 204, it is determined, based at least on the detecting, that the user desires to speak to a subject in the vicinity of the user. In an aspect, detecting that the user desires to speak to a subject in the vicinity of the user includes detecting at least one of the detected speech signal does not include a wake-up word (WUW) configured to trigger a voice personal assistant (VPA), the detected speech signal does not include voice commands for the VPA, the user is participating in a phone conversation using the audio output device and a voice stream of the user related to the phone conversation as received from the microphone of the audio output device is set to mute by the user, or the user is streaming music to the audio output device and the speech signal does not indicate that the user is singing.

At 206, in response to determining that the user desires to speak to the subject in the vicinity of the user, a level of the active noise reduction is lowered to enable the user to hear sounds external to the audio output device.

In certain aspects, when at least one of the headphone microphones (e.g., microphones 112) detect a sound in the vicinity of the user, the sound is analyzed to determine if the sound relates to or includes a speech signal generated as a result of the user speaking.

In an aspect, a sound signal detected by the headphone microphones is processed by a VAD module in the headphones, in an attempt to detect a speech signal. In an aspect, in order to avoid false triggers, the system confirms that a detected speech signal corresponds to the user speaking and not to other people speaking in the vicinity of the user. Thus, in an aspect, speaker identification is applied to a speech signal detected by the VAD module, in order to determine whether the speech signal corresponds to the user speaking. The speaker identification ensures that the ANR control algorithm is triggered only when the user is speaking and not when other subjects in the vicinity of the user are speaking.

In certain aspect, in order to avoid detecting speech signals from other subjects in the vicinity of the user, beamforming is applied to the microphone speakers and the microphone listening is focused in the general direction of the user's mouth. This lowers the possibility of the microphones receiving sounds from other directions and avoids unnecessary processing, thus saving power. Additionally, the microphone beamforming improves accuracy of detection of speech signals generated by the user speaking.

In an aspect, additionally or alternatively, one or more sensors in the headphones may be used to detect that the user is speaking. For example, an Inertial Measurement Unit (IMU) sensor in the headphones may be used to detect movements related to the user's mouth and the IMU data stream may be used to detect whether the user is speaking based on how the user's mouth is moving. In an aspect, the IMU sensor includes at least one of one or more accelerometers, one or more magnetometers, or one or more gyroscopes.

In certain aspects, detecting that the user desires to speak to another subject in the vicinity of the user includes checking for one or more conditions, and determining that the user desires to speak to another subject only when the one or more conditions are met.

In an aspect, one condition may include determining that the detected speech signal does not relate to a wake-up word uttered by the user for triggering a Virtual Personal Assistant (VPA) module. In an aspect, the VPA module may be configured in the headphones or a user device (e.g., user device 120) connected to the headphones. In an aspect, the headphones may include a language processing module for detecting whether the speech signal includes the wake-up word.

In an aspect, another condition may include determining that the detected speech signal does not include a voice command for the VPA module or another voice interface. In an aspect, any speech from the user detected within a predetermined time from detecting the wake-up word uttered by the user is determined as a voice command for the VPA module.

In an aspect, another condition may include determining that the user is engaged in a voice call (e.g., a Bluetooth Hands Free Profile (HFP) call) and that the user's voice stream from the headphone microphones is muted for the voice call. In an example case, a user may be engaged in a conference call with one or more other parties, with the ANR turned on to avoid disturbances. It is typical for a user to temporarily mute the microphone stream so that other participants in the voice call are not disturbed by background noise in the user's vicinity. In an aspect, when it is determined that the user is engaged in a voice call and that the user's voice stream is muted for the voice call, the ANR control algorithm assumes that the user is okay to speak with a subject in the vicinity of the user. It may be noted that when the user mutes the headphone microphones during a voice call, the microphones may continue to detect sounds in the vicinity of the user including the user's voice stream without transmitting the detected voice stream, for example, to the user device for communicating to one or more parties engaged in the voice conversation with the user.

In an aspect, another condition may include detecting that the user is listening to a music stream (e.g., over the Bluetooth A2DP or other music profile) over the headphone speakers and that the speech signal does not relate to the user singing or humming along. In an aspect, when it is detected the headphone speakers are playing a music stream and that the detected speech signal relates to the user singing or humming along, the ANR control algorithm determines that the user does not intend to speak with another subject in the vicinity of the user.

In certain aspects, the ANR control algorithm may be configured to check for one or more of the above described conditions in order to determine whether the user desires to speak with another subject in the vicinity of the user. It may be noted that the above discussed conditions is not an exhaustive list of conditions, and that the ANR control algorithm may be configured to check for one or more other conditions in an attempt to determine whether the user desires to speak with another subject.

In certain aspects, when the user is detected as speaking and when all the configured conditions are satisfied, the ANR control algorithm lowers the ANR so that the user is more acoustically aware of the user's surroundings. For example, the ANR is lowered only when it is determined that the detected speech signal does not relate to a wake-up word uttered by the user for triggering a VPA module, the detected speech signal does not include a voice command for the VPA module or another voice interface, it is determined that the user is engaged in a voice call and that the user's voice stream from the headphone microphones is muted for the voice call, and it is detected that the user is listening to a music stream (e.g., over the Bluetooth A2DP or other music profile) over the headphone speakers and that the speech signal does not relate to the user singing or humming along.

In an aspect, the ANR is temporarily set to a predetermined low level (or temporarily turned off) to allow the user to hear external sounds more clearly and audibly. In an aspect, the temporary duration for lowering or turning off the ANR is defined by a pre-configured aware timer. In an aspect, the pre-configured aware timer is started when the ANR is lowered or turned off. In an aspect, the ANR is restored to its previous level or set to a pre-configured level (e.g., a higher level) when the aware timer expires.

In certain aspect, after the ANR has been lowered and when the aware timer is running, the ANR control algorithm continually monitors for speech uttered by the user. If further speech is detected from the user, the ANR checks for the configured conditions and resets the aware timer to the original configured value such that the aware state is extended by the aware timer duration. In an aspect, the aware timer is reset upon every instance of detecting speech from the user subject to all the configured conditions being satisfied.

In an aspect, the duration of the aware timer is selected as 1 minute as it is typical for the user to acknowledge the other party at least once every minute. However, this duration may be set to any value. In an aspect, the value of the aware timer may be configured by the user by using a user interface on the user device.

In certain aspects, in addition to lowering the ANR, a volume of audio/music playing on the headphone speakers may be optionally lowered or the audio/music may be paused or stopped from playing, in order to provide the user with better situational awareness.

The ANR control technique discussed in aspects of the present disclosure may be useful in several use cases.

In one example use case, the user may be participating in a conference call and may be streaming audio of the conference call to the headphones and may have the ANR turned on to avoid any disturbances while listening to the audio related to the conference call. The user may further have the microphone stream muted so that other participants in the conference call are not disturbed by background noise in the user's vicinity. When the user wishes to speak with another person in the vicinity of the user (e.g., a colleague wanting to speak with the user), the user may start speaking to the other person, and the ANR control algorithm in the headphones will automatically lower the ANR to aid the user to speak with the other person. In an aspect, even though the voice stream of the user is muted for the conference call, the microphones continue to listen to sounds in the vicinity of the user without transmitting the received sounds to the conferencing application for communication to other parties participating in the conference call. When the user starts speaking, the ANR control algorithm detects that the user is speaking (e.g., based on VAD and user identification) and further detects that the user's voice stream is muted. In response, the algorithm determines that the user desires to speak with another subject and automatically switches to an aware state by lowering the ANR (e.g., sets the ANR to a pre-configured level). This enables the user to speak to the other person while still monitoring the conference call, allowing the user to jump back into the call if needed (e.g., if a party in the conference call addresses the user). In an aspect, when the user unmutes the microphone stream to participate in the conference call, the aware state is automatically exited and the ANR is set to a predetermined high level or a previously set level (e.g., before the aware state was initialized).

In an aspect, in addition to lowering the ANR, the volume of the conferencing audio may be automatically lowered, or played only on one of the headphone speakers to aid the user's interaction with the other person. The ANR control algorithm may automatically restore the ANR level to a previous level, when the timer expires.

In certain aspects, it is common for user's participating in a voice call to temporarily mute the voice stream and then forget about it. The user may then start speaking to another party over the voice call not knowing that the user's voice stream is muted. The ANR control algorithm provides a clear audible feedback to the user to indicate that the user is speaking to a muted microphone. As noted above, when the user starts speaking with the user's voice stream set to mute, the headphones automatically enter an aware state and the ANR is automatically lowered. This change of ANR level from a higher noise reduction level to a lower level is typically a clear audible difference to the user and may act as a reminder that the user is speaking to a muted microphone.

In certain aspects, when the headphones are already in a lowered ANR state and whenever the user acknowledges another subject conversing with the user with any speech, the VAD triggers the ANR control logic described above, and if all conditions are met, the headphones continue to be in the aware state. In an aspect, this logic works under the assumption that most users would acknowledge a second party in a conversation vocally with sounds or words like "Hmmm", "okay", "that's right", "yes", "no", "interesting", etc., even if the user is not saying much in a two party conversation. Thus, when the headphones are already in the aware state, whenever the user utters one or more words that indicate the user is acknowledging the other party in a conversation, the aware timer is reset and the headphones continue to be in the aware state.

In certain aspects, certain aspects of the ANR control algorithm discussed in this disclosure may be used for controlling ANR for conversations initiated by subjects other than the user. For example, the headphones may enter the aware state and lower the ANR when another person starts a conversation with the user. One or more pre-configured words spoken by a non-user speaker may trigger the headphones to enter the aware state. These pre-configured words may include the user's name, one or more aliases, words and phrases generally used by people to address other people (e.g., Hello, Hi etc.,) or a combination thereof. Once the headphones enter the aware state and a conversation has started between the user and the other person, the logic described above may be used to extend the aware state of the headphone and to restore ANR levels.

Figure 3:
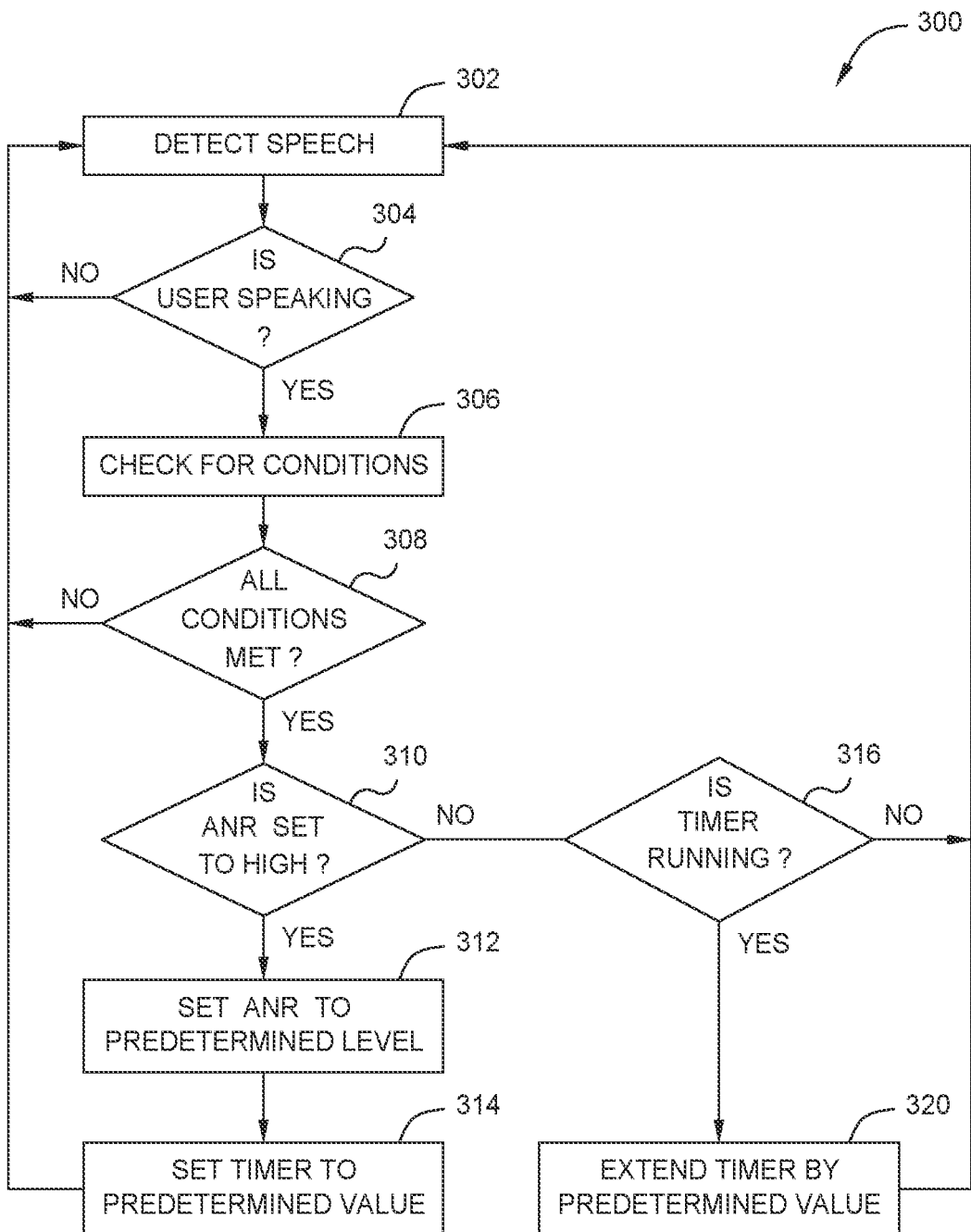
FIG. 3 illustrates example operations for an automatic ANR control algorithm, in accordance with certain aspects of the present disclosure.

FIG. 3 illustrates example operations 300 for an automatic ANR control algorithm, in certain aspects of the present disclosure.

Operations 300 begin, at 302, by the algorithm detecting a speech signal. As described in the above paragraphs, one or more microphones of the ANR headphones may detect external sounds in the vicinity of the headphones and the VAD module of the headphones may extract any speech signals included in the detected external sounds.

At 304, the algorithm determines whether the detected speech signals correspond to the user speaking. As described in the above paragraphs, an existing user identification/recognition algorithm may be used in order make this determination. If it is determined that the user is not speaking, the algorithm is returned back to process block 302, where the algorithm continues to monitor for speech signals.

When it is determined that the user is speaking at 304, the algorithm checks for one or more configured conditions at 306 in order to determine whether the user desires to speak with another subject in the vicinity of the user. As described above, the configured conditions may include at least one of determining that the detected speech signal does not relate to a wake-up word uttered by the user for triggering a VPA module, the detected speech signal does not include a voice command for the VPA module or another voice interface, determining that the user is engaged in a voice call and that the user's voice stream from the headphone microphones is muted for the voice call, or detecting that the user is listening to a music stream (e.g., over the Bluetooth A2DP or other music profile) over the headphone speakers and that the speech signal does not relate to the user singing or humming along.

At 308, the algorithm determines whether all the configured conditions are satisfied. If all the configured conditions are determined as not satisfied, the algorithm is returned back to process block 302. However, if all the configured conditions are determined as satisfied, the algorithm checks at 310 whether the ANR is set to a high level. If the ANR is determined as set to a high level, the headphones enter an aware state by setting the ANR to a pre-configured low level at 312. At 314, a timer (e.g., aware timer discussed above) is set to a predetermined value to set duration for the aware state.

In an aspect, if the ANR is determined as not set to high at 310, the algorithm checks whether the aware timer is running at 316. If the aware timer is not running, the algorithm is returned to process block 302. In an aspect, the aware timer not running at 316 may indicate that the user has manually set the ANR to a low level which does not trigger the aware timer.

If the aware timer is determined as running at 316, the algorithm extends the aware state by a predetermined duration at 320. For example, the aware timer is extended by a predetermined value.

It may be noted that the processing related to the automatic ANR control as discussed in aspects of the present disclosure may be performed natively in the headphones, by the user device or a combination thereof.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method of controlling a wearable audio device having active noise reduction (ANR) capabilities, the method comprising:
    detecting a speech signal from a user wearing the wearable audio device, wherein the ANR is set to a first level;
    in response to detecting the speech signal, determining whether the speech signal is not related to a purpose other than to speak with another person; and
    in response to determining that the speech signal is not related to a purpose other than to speak with another person, automatically setting the ANR to a second level that allows the user to hear sounds external to the wearable audio device more audibly relative to the first level,
    wherein determining whether the speech signal is not related to a purpose other than to speak with another person includes determining that the speech signal is not provided during a call that is unmuted.

2. The method of claim 1, wherein detecting the speech signal includes at least one of
    detecting that a sound signal including speech is emanating from a general direction of the user's mouth,
    detecting that the sound signal includes the speech using voice activity detection (VAD),
    detecting that the user's mouth is moving, or
    detecting an identity of the user based on the speech.

3. The method of claim 1, wherein determining whether the speech signal is not related to a purpose other than to speak with another person includes determining that the speech signal does not include a wake-up word (WUW) configured to trigger a voice personal assistant (VPA).

4. The method of claim 1, wherein determining whether the speech signal is not related to a purpose other than to speak with another person includes determining that the speech signal does not include voice commands for a voice personal assistant (VPA).

5. The method of claim 1, wherein determining whether the speech signal is not related to a purpose other than to speak with another person includes determining that the speech signal is provided during a call that is muted.

6. The method of claim 1, wherein determining whether the speech signal is not related to a purpose other than to speak with another person includes determining that the speech signal does not include singing or humming while music is being played by the wearable audio device.

7. The method of claim 1, wherein the second level of the ANR turns the ANR off.

8. The method of claim 1, further comprising, in response to determining that the speech signal is not related to a purpose other than to speak with another person, automatically lowering a volume of audio or music played by the wearable audio device.

9. The method of claim 1, further comprising, in response to determining that the speech signal is not related to a purpose other than to speak with another person, automatically pausing or stopping audio or music played by the wearable audio device.

10. The method of claim 1, wherein the second level of the ANR is an aware state.

11. A wearable audio device having active noise reduction (ANR) capabilities, the wearable audio device comprising:
    at least one microphone; and
    at least one processor configured to
        detect a speech signal from a user wearing the wearable audio device, the speech signal detected using the at least one microphone, wherein the ANR is set to a first level;
        in response to detecting the speech signal, determine whether the speech signal is not related to a purpose other than to speak with another person; and
        in response to determining that the speech signal is not related to a purpose other than to speak with another person, automatically set the ANR to a second level that allows the user to hear sounds external to the wearable audio device more audibly relative to the first level,
        wherein determining whether the speech signal is not related to a purpose other than to speak with another person includes determining that the speech signal is not provided during a call that is unmuted.

12. The wearable audio device of claim 11, wherein detecting the speech signal includes at least one of
    detecting that a sound signal including speech is emanating from a general direction of the user's mouth,
    detecting that the sound signal includes the speech using voice activity detection (VAD),
    detecting that the user's mouth is moving, or
    detecting an identity of the user based on the speech.

13. The wearable audio device of claim 11, wherein determining whether the speech signal is not related to a purpose other than to speak with another person includes determining that the speech signal does not include a wake-up word (WUW) configured to trigger a voice personal assistant (VPA).

14. The wearable audio device of claim 11, wherein determining whether the speech signal is not related to a purpose other than to speak with another person includes determining that the speech signal does not include voice commands for a voice personal assistant (VPA).

15. The wearable audio device of claim 11, wherein determining whether the speech signal is not related to a purpose other than to speak with another person includes determining that the speech signal is provided during a call that is muted.

16. The wearable audio device of claim 11, wherein determining whether the speech signal is not related to a purpose other than to speak with another person includes determining that the speech signal does not include singing or humming while music is being played by the wearable audio device.

17. The wearable audio device of claim 11, wherein the second level of the ANR turns the ANR off.

18. The wearable audio device of claim 11, wherein the at least one processor is further configured to, in response to determining that the speech signal is not related to a purpose other than to speak with another person, automatically lower a volume of audio or music played by the wearable audio device.

19. The wearable audio device of claim 11, wherein the at least one processor is further configured to, in response to determining that the speech signal is not related to a purpose other than to speak with another person, automatically pause or stop audio or music played by the wearable audio device.

20. The wearable audio device of claim 11, wherein the second level of the ANR is an aware state.

\* \* \* \* \*